US006804177B1

(12) United States Patent
Rieck et al.

(10) Patent No.: US 6,804,177 B1
(45) Date of Patent: Oct. 12, 2004

(54) APPARATUS SELECTING DIFFERENT POSITION SIGNALS AT DIFFERENT SCANNING VELOCITIES TO DETERMINE DISPLACEMENT OF RECORD CARRIER SCANNING

(75) Inventors: Marcel Rieck, Eindhoven (NL); Arnoldus Jeroen Niessen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 682 days.

(21) Appl. No.: 09/613,232

(22) Filed: Jul. 10, 2000

(30) Foreign Application Priority Data

Jul. 8, 1999 (EP) ............................................ 99202220

(51) Int. Cl.[7] .............................................. G11B 7/085
(52) U.S. Cl. ................................ 369/30.15; 369/30.13; 369/30.14; 369/44.28; 369/30.17
(58) Field of Search ........................... 369/30.13, 30.14, 369/30.15, 30.17, 44.28, 53.29, 44.27, 44.29

(56) References Cited

U.S. PATENT DOCUMENTS

| | | | |
|---|---|---|---|
| 4,583,209 A | | 4/1986 | Bierhoff ........................ 369/46 |
| 5,001,732 A | * | 3/1991 | Nomura et al. ................ 377/3 |
| 5,050,146 A | * | 9/1991 | Richgels et al. ........... 369/30.15 |
| 5,101,390 A | * | 3/1992 | Kuwabara .................. 369/44.28 |
| 5,199,017 A | * | 3/1993 | Kagami et al. ............ 369/44.28 |
| 5,289,446 A | | 2/1994 | Dekker et al. ............. 369/44.25 |
| 5,870,356 A | * | 2/1999 | Ikeda ........................ 369/30.15 |

FOREIGN PATENT DOCUMENTS

DE 4029975 A1 3/1992

* cited by examiner

Primary Examiner—W. R. Young
Assistant Examiner—M. V. Battaglia
(74) Attorney, Agent, or Firm—Michael E. Belk

(57) ABSTRACT

In a scanning apparatus, a scanning spot is moved along a path from one track to another track of the information carrier, the scanning spot is accelerated in a first stage of the movement and decelerating in a second stage of the movement. Initially during the movement a displacement of the scanning spot is derived from a first and a second position signal. The velocity of the scanning spot is estimated during movement along the path. After the estimated velocity of the scanning spot exceeds a first predetermined value during the first stage of the movement, the displacement of the scanning spot is derived from the first position signal and independent from the second position signal, during movement along the path. After the estimated velocity has decreased below a second predetermined value during the second stage of the movement, the displacement of the scanning spot is again derived from both the first and the second position signal, during movement along the path.

11 Claims, 2 Drawing Sheets

ID DIFFERENT
APPARATUS SELECTING DIFFERENT POSITION SIGNALS AT DIFFERENT SCANNING VELOCITIES TO DETERMINE DISPLACEMENT OF RECORD CARRIER SCANNING

The invention relates to an apparatus for scanning an information carrier, comprising:

displacement means for moving a scanning spot along a path transverse to the tracks of the information carrier, position information generating means for generating a position signal which is indicative of the position of the scanning spot on the path with respect to a track, velocity information generating means for generating a velocity signal which is a measure of the velocity of the scanning spot along the path, a phase-locked loop for generating a corrected position signal which is locked to the position signal, means for estimating a displacement of the scanning spot on the basis of the corrected position signal.

The invention further relates to a method of operating such an apparatus.

Such an apparatus and such a method are known from DE 40 29 975 A1. The known apparatus is intended for scanning a disc-shaped information carrier so as to inscribe or to read the information carrier. A transducer generates a positional error signal which is a measure of the position of the scanning spot with respect to a track. From the positional error signal a pulsed track crossing signal is derived. A phase-locked loop corrects the track crossing signal so as to generate an error-corrected track crossing signal. This error-corrected track crossing signal is used for calculating the displacement of the scanning spot. In one embodiment the apparatus further has velocity information generating means in order to achieve that the scanning spot is moved in accordance with a predetermined velocity profile.

In practice, the tracks of a data carrier are not always concentric with the axis. In the case of a comparatively slow movement of the scanning spot this causes the scanning spot to be moved alternately in an inward and an outward direction with respect to the tracks. A consequence of this is that tracks are counted more than once, as a result of which the displacement detected for the scanning spot is too large.

It is an object of the invention to provide an apparatus of the type defined in the opening paragraph in which the displacement of the data carrier is detected accurately even in the case of an eccentric data carrier. To this end, the apparatus in accordance with the invention is characterized in that the position information generating means generate a further position signal which is phase-shifted with respect to the position signal, said apparatus assuming a first mode of operation at a comparatively low velocity of the scanning spot, in which first node of operation the displacement of the scanning spot is derived from both position signals and a second mode of operation at a comparatively high velocity of the scanning spot, in which second mode of operation the displacement is derived from the position signal.

During a jump from one track to another track the scanning spot has a velocity which is initially low, increases to a comparatively high velocity, may remain temporarily constant and subsequently decreases again. In the apparatus in accordance with the invention it is achieved that the displacement of the scanning spot is determined accurately during the entire jump. Since the displacement of the scanning spot is derived from the two mutually phase-shifted position signals at a comparatively low velocity, it is possible to detect crossing of a track as well as the direction of this crossing. Thus, the displacement of the scanning spot can be determined comparatively accurately. At comparatively high velocities one of the position signals usually becomes unreliable. However, at comparatively high velocities a possible eccentricity of the tracks no longer affects the direction. The displacement of the scanning spot is then derived accurately from the corrected position signal.

The velocity-determining means can be realized in various manners. Said means can, for example, estimate the velocity of the scanning spot on the basis of the measured displacement. Alternatively, the velocity of the scanning spot can, for example, be estimated from the signals generated for controlling the displacement.

The measures in accordance with the invention are particularly suitable for an apparatus for scanning a disc-shaped information carrier. However, the measures in accordance with the invention can also be applied to other, for example card-shaped, information carriers.

A further object of the invention is to provide a method of operating an apparatus for scanning an information carrier, in which the displacement can be also be determined comparatively accurately in the case of eccentric data carriers. In the method according to the invention a scanning spot is moved along a path from one track to another track of the information carrier, the scanning spot undergoing an accelerated movement in a first stage of the path and deceleration in a second stage of the path, during which movement along said path in succession a displacement of the scanning spot is derived from a first and a second position signal and, after an estimated value of the velocity of the scanning spot has exceeded a predetermined value, is derived from the first position signal and is independent of the second position signal, after which the displacement of the scanning spot is again derived from the first and the second position signal when the estimated value of the velocity has decreased to a value smaller than a predetermined value.

These as well as further aspects of the apparatus in accordance with the invention will be described in more detail with reference to the drawings. In the drawings.

Figure 1:
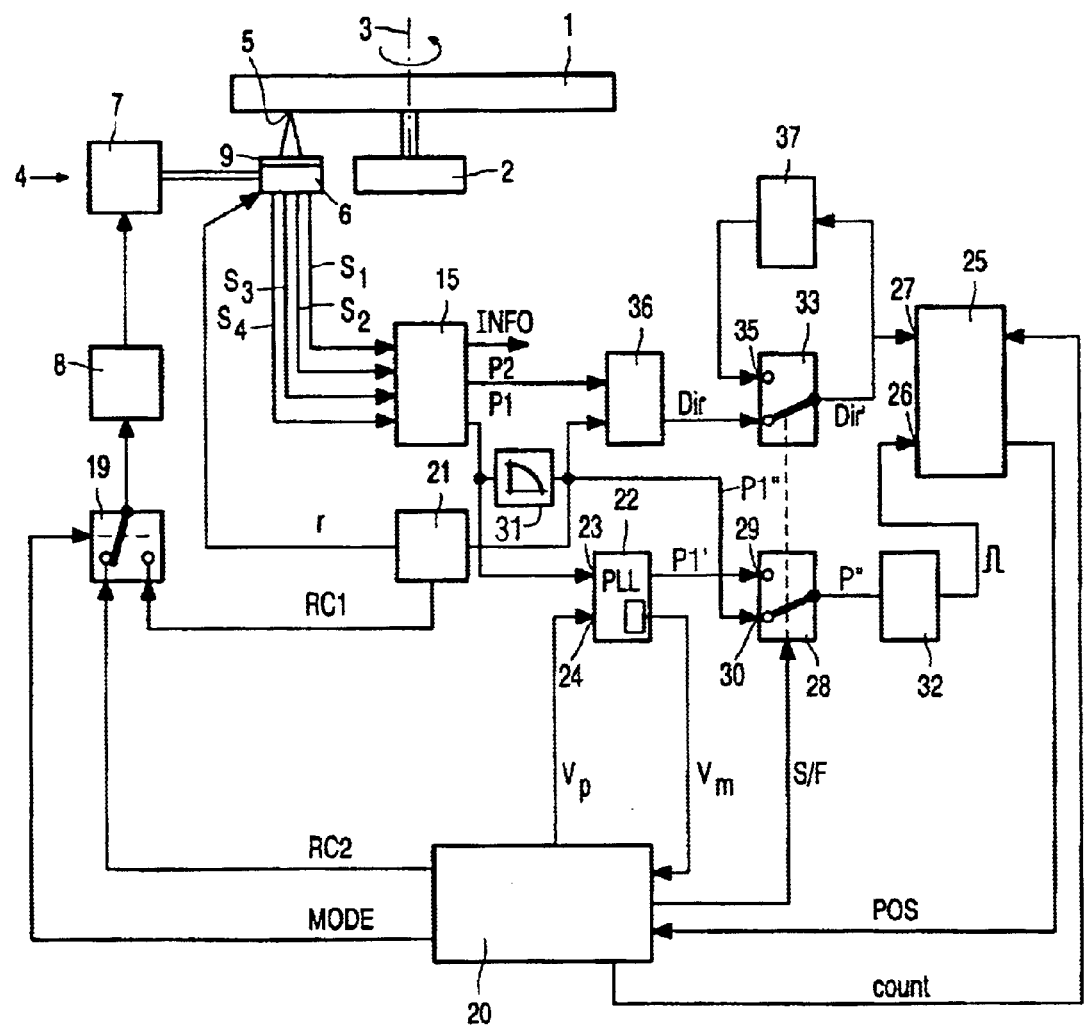
FIG. 1 shows an embodiment of the apparatus in accordance with the invention.

FIG. 1 shows an apparatus in accordance with for scanning an information carrier 1. The information carrier 1 shown is disc-shaped and is rotated about an axis 3 by means of a motor 2. The tracks are, for example, concentric with each other or together form a spiral. In another form the information carrier is a card in which the tracks extend along a longitudinal direction of the card. The information carrier 1 is suitable for the recording of information in the form of optically detectable patterns in the tracks of the information carrier. Alternatively, the information carrier may be, for example, a magnetic or a magneto-optical information carrier. The apparatus shown has displacement means 4 for moving a scanning spot along a path transverse to the tracks of the information carrier 1. The scanning spot 5 then moves radially with respect to the information carrier. The displacement means 4 include a slide 6, which is radially movable by means of a motor 7. The motor 7 is controlled by control means 8. The slide 6 carries a transducer 9 for the generation of electrical signals S1–S4 in response to the optically detectable patterns. The transducer 9 is for example of a type as described in U.S. Pat. No. 5,268,885. Such a transducer 9 includes means comprising a lens for imaging a radiation beam so as to form the scanning spot 5 and detection means for detecting the intensity of the radiation reflected from the information carrier. In the present case, the detection means 10 comprise a detector having four subdetectors 11–14 (see FIG. 2). The displacement means 4 further include an actuator (not shown) for moving the lens radially with respect to the slide 6. By means of a further actuator (not shown) the lens is also movable in an axial direction with respect to the information carrier 1. The apparatus has position information generating means 15 for generating a position signal P1 which is indicative of the radial position of the scanning spot 5 with respect to a track. In the present case, the position signal P1 has been obtained by means of the circuit shown in FIG. 2. In said circuit the signals S1, S2, S3, S4 from the four subdetectors 11–14 are summed by an adder 16. The output signal of the adder 16 is applied to a non-inverting input of a subtractor 17. The output signal of the subtractor 17 is coupled to an inverting input of the subtractor 17 via a d.c. detector 18. The output signal serves as an information signal INFO, which represents the information read from the information carrier 1, and also serves as the position signal P1. The signal P1 thus generated is maximal if the scanning spot 5 is centered on a track. The apparatus has a scanning mode in which the scanning spot 5 follows a track and a jump mode in which the scanning spot 5 is moved from one track to another track. For this purpose, the apparatus has switching means 19. The state of the switching means 19 is dictated by a MODE signal from a microprocessor 20. In the scanning mode the switching means 19 are in a first state, in which the output signal of the switching means 19 originates from an output signal RC1 of a servo-system 21. The servo-system 21 further supplies a radial control signal r to the actuator for the radial positioning of the lens. In the jump mode the switching means 19 are in a second state (shown in FIG. 1), in which the output signal of the switching means 19 is a signal RC2 from the microprocessor 20.

Figure 3:
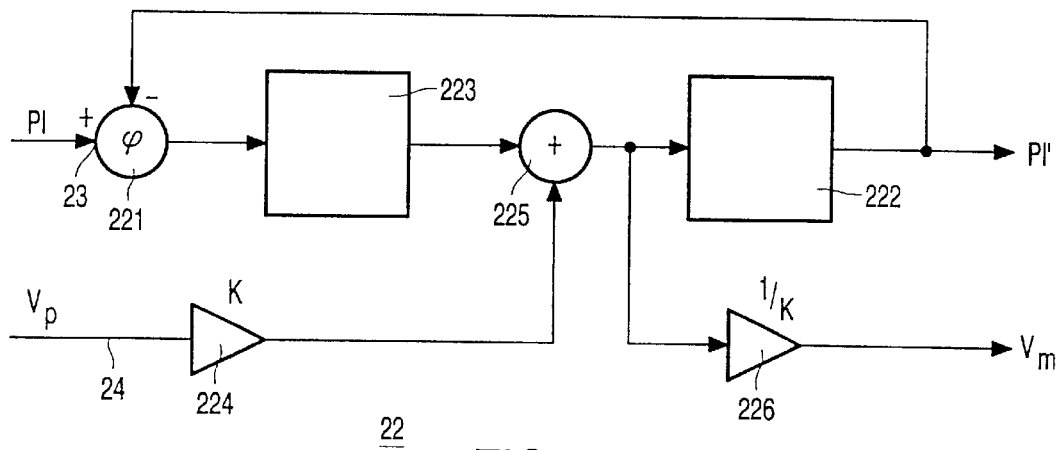
FIG. 3 shows a further part of the apparatus shown in FIG. 1.

The apparatus further has velocity information generating means 22 for deriving the velocity of the scanning spot 5 along its path. As is shown in FIG. 3, the velocity information generating means 22 have been integrated with a phase-locked loop (PLL). This phase-locked loop has an input 23 coupled to an output of the position information generating means 15. A further input 24 is coupled to an output of the microprocessor 20, which output supplies a signal Vp which is a measure of a predicted value of the radial velocity of the scanning spot 5. Said value is predicted from the value of the signal RC2 supplied by the microprocessor 20 and from the characteristics of the displacement means 4, 6, 7. The phase-locked loop 22 has a phase comparator 221 for the generation of an error signal which is proportional to the phase difference between the first position signal P1 and the feedback signal P1', i.e. in the present case the output signal of a controllable oscillator 222. The phase comparator 221 has an output coupled to a low-pass filter 223, which generates a low-frequency error signal in response to the error signal. The PLL 22 further has an amplifier 224, which amplifies the signal Vp by a factor K. An adder 225 adds the amplified signal to the low-frequency error signal generated by the filter 223. The output signal of the adder 225 serves as a control signal for the controllable oscillator 222. The adder 225 is also coupled to an amplifier 226 having a gain factor 1/K, for the generation of a signal Vm which is indicative of the measured value of the radial velocity of the scanning spot 5. The output signal of the controllable oscillator 222 functions as the corrected position signal P1'. The apparatus further has means 25 for the estimation of a displacement of the scanning spot 5 on the basis of the corrected position signal P1'. Said means 25 take the form of an up/down counter having a first input 26 for incrementing or decrementing the count in response to a pulse received on this input in dependence on a counting direction signal on a second input 27.

From the four detector signals S1, S2, S3, S4 the position generating means 15 derive a further position signal P2, which is shifted in phase with respect to the position signal P1. In the present embodiment the further position signal P2 is a tracking error signal obtained by means of a method as described in U.S. Pat. No. 4,583,209. In accordance with said method the tracking error signal is derived from the time interval between zero crossings of a first sum signal generated from the signals of two diagonally opposed subdetectors and of a second sum signal generated from signals of the other diagonally opposed subdetectors. The apparatus further includes first and second switching means 28, 33. The first switching means 28 have a first terminal 29 for receiving the corrected position signal P1' and a second terminal for receiving the position signal P1" via a low-pass filter 31. The first switching means 28 supply an output signal selected from one of these signals to pulse generating means 32. The pulse generating means 32 supply a counting signal to the first input 26 of the up/down counter 25. The second switching means 33 supply a counting direction signal to the second input 27 of the means 25 for determining the displacement. This counting direction signal has been selected from a direction signal DIR appearing on a first terminal 34 of the second switching means 33 and supplied by direction signal generating means 36 and a direction signal appearing on a second terminal 35 and supplied by a sample and hold register 37. The direction signal generating means 36 derive the direction signal DIR from the position signal P1 and the further position signal P2. With the aid of the first and the second switching means 28, 33 it is achieved that the displacement of the scanning spot 5 at a comparatively low speed is derived from the two position signals P1, P2 and at a comparatively high speed from the corrected position signal P1'. For this purpose, the first and the second switching means 28, 33 have a control input 38 for receiving a control signal S/F from an output of the microprocessor 20.

Figure 2:
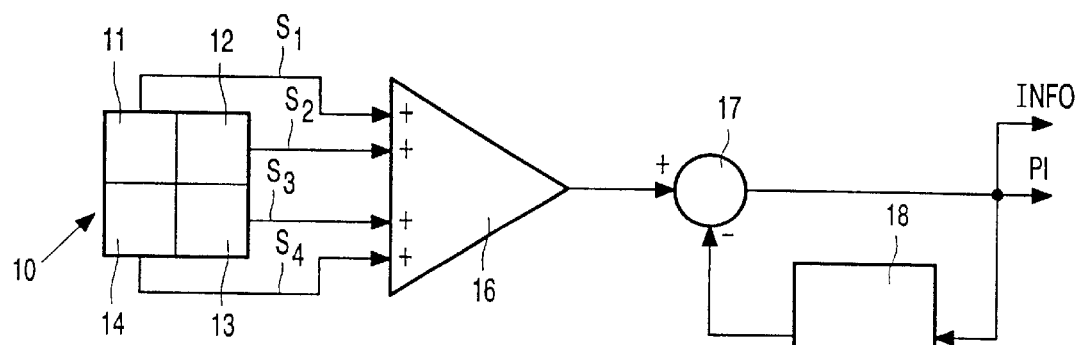
FIG. 2 shows a part of the apparatus shown in FIG. 1.
Figure 4:
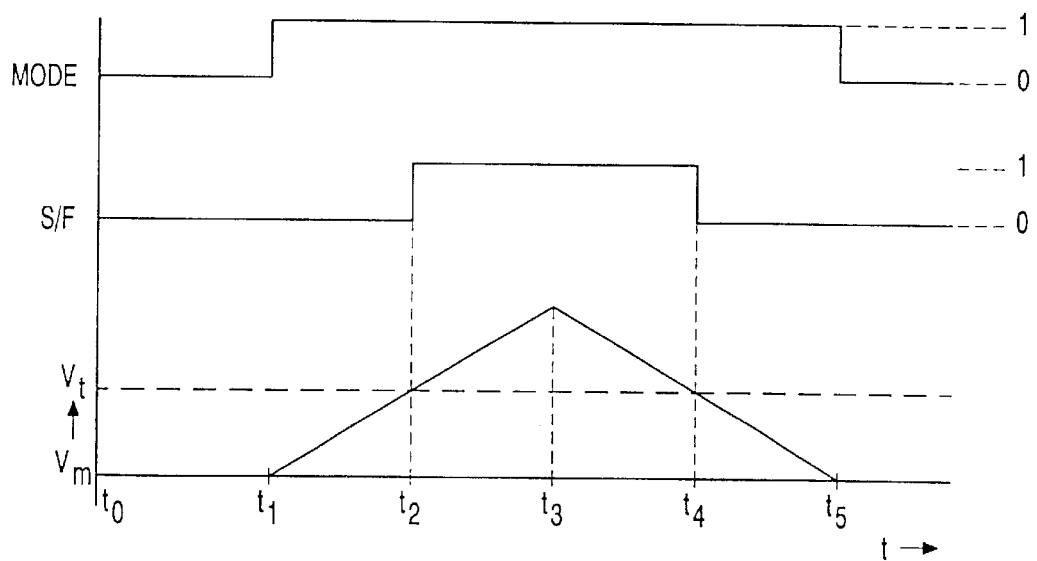
FIG. 4 shows some signal waveforms appearing in the apparatus shown.

The apparatus shown in FIGS. 1 to 3 will now be described in more detail with reference to FIG. 4. In the present embodiment the apparatus is in the scanning mode in the time interval from t0 to t1. The MODE signal generated by the microprocessor 20 then has a logic value "0". Under the influence of this, the switching means 10 select the signal RC1 as the input signal for the control means 8. The servo-system 21 then causes the scanning spot 5 to follow a track of the information carrier 1 so as to read or write this track. At the instant t1 the microprocessor 20 receives a command to move the scanning spot 5 to another track. In response thereto the microprocessor 20 gives the MODE signal the logic value "1". The apparatus is then in the jump mode. Under the influence of the MODE signal the switching means 19 now assume the state shown in FIG. 1, as a result of which the switching means 19 select the signal RC2 supplied by the microprocessor 20 as the input signal. The microprocessor 20 subsequently computes the number of tracks to be crossed for the jump from the current track to the desired other track and loads this count number into the counter 25. By means of the signal RC2 the microprocessor 20 causes the transducer 9 to undergo an accelerated movement to the desired track. In a first stage of the movement, which lasts from t1 to t2, the transducer 9 still has a comparatively low velocity. In this stage the signal S/F generated by the microprocessor 20 has a logic value "0", as a result of which the first and the second switching means 28, 33 assume the state shown in FIG. 1. In this stage the second switching means 33 select the counting direction signal DIR generated by the means 36 from the two position signals P1", P2. The position signal P1" has been derived from the position signal P1 with the aid of the low-pass filter 31. The counting direction signal DIR thus obtained is sampled by the means 37, for example a D flip-flop. The counting signal is derived from the signal P". The pulse generating means 32 generate a pulse upon each rising edge of the signal P". Upon each pulse the counter 25 counts up or down depending on the value of the counting direction signal DIR'. In the case that the information carrier 1 is eccentric the scanning spot initially crosses the tracks alternately in a direction towards the desired track and in a direction away from the desired track. The counting direction signal DIR' causes the counter 25 to count down in the first case and to count up in the second case. The position signal P1 is each time applied to the phase-locked loop 22. The phase comparator 221 generates an error signal which is proportional to the difference in phase between the first position signal P1 and the feedback signal P1', in the present case the output signal of the controllable oscillator 222. The low-pass filter 223 generates a low frequency error signal in response to the error signal. The PLL 22 further receives the signal Vp which is indicative of the predicted value of the velocity of the transducer 5. The signal Vp is amplified by a factor K and is added to the low frequency error signal. The resulting signal serves as the control signal for the controllable oscillator 222. The additional control of the PLL 22 by the signal Vp allows the filter 223 of the PLL to have a small bandwidth, as a result of which the PLL 22 is immune to noise, while the PLL can yet follow the position signal P1 within a large bandwidth and can supply a signal P1' which is locked the position signal P1. The apparatus in accordance with may further include detection means for the detection of defects such as scratches in the information carrier 1 and in response thereto supplying a detection signal which causes the state of the PLL 22 to be maintained. The influence of the defects on the measurement of the displacement and the velocity of the scanning spot is then small. If the microprocessor detects that the measured value Vm of the velocity exceeds a predetermined value Vt, in the present case at an the instant t2, the apparatus is set to a second mode of operation. On the one hand, the predetermined value Vt of the velocity is greater than the value at which a possible eccentricity of the information carrier 1 influences the direction in which the tracks are crossed. On the other hand, the predetermined value Vt is smaller than the value at which the further position signal P2 is no longer reliable. In the second mode of operation the microprocessor 20 assigns the logic value "1" to the signal S/F. As a result of this, the first switching means 28 select the output signal P1' of the PLL 22 as the input signal for the pulse generating means 32, which generate the counting signal. The signal S/F further causes the switching means 33 to select the output signal of the means 37 as the counting direction signal. The counting direction is now maintained in accordance with the last value determined before the change to the second mode of operation. In the second mode of operation the further position signal P2 no longer influences the measurement of the displacement. The position signal P1 is corrected by means of the PLL 22. Consequently, the number of track crossings is also counted comparatively accurately in the second phase of the jump. At an instant t3 the scanning spot 5 is approximately halfway the path from the original track to the desired track. The movement of the scanning spot 5 is now slowed down. The apparatus remains in the second mode of operation until an instant t4. The velocity Vm of the scanning spot 5 has then become lower than a predetermined velocity Vt. This velocity Vt is preferably equal to the velocity at which the apparatus changes over from the first to the second mode of operation. At the instant t4 the apparatus returns to the first mode of operation, in which the microprocessor 20 assigns the logic value "0" to the signal S/F. Consequently, the first and the second switching means 28, 33 assume the state shown in FIG. 1, as a result of which the displacement of the scanning spot 5 is again derived from the two position signals P1, P2. At an instant t5, when the desired track is reached, the apparatus again assumes a scanning mode. For this purpose, the microprocessor 20 assigns the logic value "0" to the MODE signal, as a result of which the switching means 19 select the signal RC1 as the input signal for the control means 8.

The invention has been described with reference to preferred embodiments but is not limited thereto. It will be obvious to one skilled in the art that various modifications are conceivable within the scope as defined in the Claims. For example, in an alternative embodiment the position signal P1 and the further position signal P2 are a radial error signal and a tracking signal, respectively, as described in U.S. Pat. No. 5,289,446. The invention can be implemented by hardware as well as software means and different "means" may be materialized by the same hardware. The use of the verb "to comprise" does not exclude the presence of elements or steps other than those mentioned in a Claim. The use of the indefinite article "a" before an element does not exclude the presence of a plurality of such elements. The invention resides in any novel feature or combination of features.

What is claimed is:

1. An apparatus for scanning an information carrier, comprising:

displacement means for moving a scanning spot along a path transverse to tracks of the information carrier, position information generating means for generating a first position signal which is indicative of the position of the scanning spot on the path with respect to a track, velocity information generating means for generating a velocity signal which is a measure of the velocity of the scanning spot along the path, a phase-locked loop for generating a corrected position signal which is locked to the first position signal, means for estimating a displacement of the scanning spot on the basis of the corrected position signal, and wherein the position information generating means generates a further position signal which is phase-shifted with respect to the first position signal, and at a comparatively low velocity of the scanning spot, the displacement of the scanning spot is derived from both the first and further position signals, and at a comparatively high velocity of the scanning spot the displacement is derived from the first position signal.

2. An apparatus as claimed in claim 1, characterized in that the means for estimating the displacement are formed by an up/down counter having an input for receiving a counting signal and an input for receiving a counting direction signal, and the apparatus further comprises first switching means for accomplishing that in the first mode of operation the counting signal is based on the first position signal and that in the second mode of operation said counting signal is based on the corrected position signal, and the apparatus further comprises second switching means for accomplishing that in the first mode of operation the counting direction signal is a function of both the first and the further position signals and that in the second mode of operation the counting direction signal is independent of the position signals.

3. An apparatus as claimed in claim 2, characterized in that in the second mode of operation the counting direction signal has a value equal to the value of the counting direction signal in the first mode of operation.

4. An apparatus as claimed in claim 1, characterized in that the phase-locked loop assumes a state which is dependent on a predicted velocity which is a measure of a predicted value of the velocity of the scanning spot along the path.

5. An apparatus as claimed in claim 1, characterized in that the phase-locked loop has a phase comparator for generating an error signal which is a measure of a phase difference between an input signal and a feedback signal of the phase-locked loop, means for generating a control signal which is a measure of a low frequency component of the error signal, and means for generating a signal having a frequency which is dependent on the control signal, the velocity information signal being derived from the control signal.

6. The apparatus of claim 1 wherein at a comparatively high velocity of the scanning spot the displacement is derived from the corrected position signal which is derived from the first position signal.

7. A method of operating an apparatus for scanning an information carrier, comprising:

moving a scanning spot along a path from one track to another track of the information carrier, the scanning spot undergoing an accelerated movement in a first stage of the path and deceleration in a second stage of the path, during which movement along said path, successively deriving a displacement of the scanning spot, including:

initially deriving the displacement of the scanning spot from a first and a second position signal and, after an estimated value of the velocity of the scanning spot has exceeded a predetermined value, deriving the displacement of the scanning spot from the first position signal and substantially independent of the second position signal, after which, deriving the displacement of the scanning spot from the first and the second position signal when the estimated value of the velocity has decreased to a value smaller than a predetermined value.

8. A method, comprising:

moving a scanning spot along a path from one track to another track of the information carrier, the scanning spot accelerating in a first stage of the movement and decelerating in a second stage of the movement;

successively estimating the velocity of the scanning spot during movement along the path;

initially successively deriving a displacement of the scanning spot from a first and a second position signal;

after the estimated velocity of the scanning spot exceeds a first predetermined value during the first stage of movement, successively deriving a displacement of the scanning spot from the first position signal and independent of the second position signal; and after the estimated velocity falls below a second predetermined value during the second stage of movement, successively deriving a displacement of the scanning spot from the first and the second position signal.

9. The method of claim 8, wherein the first and second predetermined values are the same value.

10. A method, comprising:

moving a scanning spot along a path from one track to another track of the information carrier;

successively estimating the velocity of the scanning spot during movement along the path;

when the estimated velocity is below a first predetermined value during the movement, successively deriving a displacement of the scanning spot from both a first and a second position signal; and when the estimated velocity of the scanning spot exceeds a second predetermined value during the movement, successively deriving a displacement of the scanning spot from the first position signal and substantially independent of the second position signal.

11. An apparatus, comprising:

means for moving a scanning spot along a path from one track to another track of the information carrier;

means for successively estimating the velocity of the scanning spot during movement along the path;

means for successively deriving a displacement of the scanning spot;

when the estimated velocity is below a first predetermined value during the movement, the displacement is derived from both a first and a second position signal; and when the estimated velocity of the scanning spot exceeds a second predetermined value during the movement, the displacement is derived from the first position signal and is substantially independent of the second position signal.

* * * * *